(12) United States Patent
Nagumo et al.

(10) Patent No.: US 9,935,381 B2
(45) Date of Patent: Apr. 3, 2018

(54) CONNECTOR, WIRELESS COMMUNICATION MODULE, WIRELESS COMMUNICATION DEVICE, AND ELECTRONIC APPARATUS

(71) Applicant: SEIKO EPSON CORPORATION, Tokyo (JP)

(72) Inventors: Takashi Nagumo, Yamagata-Mura (JP); Hiroyuki Hashimoto, Hara-Mura (JP)

(73) Assignee: SEIKO EPSON CORPORATION, Tokyo (JP)

( * ) Notice: Subject to any disclaimer, the term of this patent is extended or adjusted under 35 U.S.C. 154(b) by 362 days.

(21) Appl. No.: 14/658,960

(22) Filed: Mar. 16, 2015

(65) Prior Publication Data

US 2015/0270655 A1    Sep. 24, 2015

(30) Foreign Application Priority Data

Mar. 20, 2014    (JP) ................. 2014-057683

(51) Int. Cl.
| | |
|---|---|
| *H01Q 21/28* | (2006.01) |
| *H01Q 9/04* | (2006.01) |
| *G03B 21/14* | (2006.01) |
| *H04N 9/31* | (2006.01) |
| *H01R 24/76* | (2011.01) |
| *H01R 24/86* | (2011.01) |
| *H01R 107/00* | (2006.01) |
| *H04W 4/00* | (2018.01) |

(52) U.S. Cl.
CPC ............ *H01Q 21/28* (2013.01); *G03B 21/14* (2013.01); *H01Q 9/0407* (2013.01); *H04N 9/3141* (2013.01); *G03B 2206/00* (2013.01); *H01R 24/76* (2013.01); *H01R 24/86* (2013.01); *H01R 2107/00* (2013.01); *H04W 4/008* (2013.01)

(58) Field of Classification Search
CPC .......................... H01Q 21/28; H01Q 9/0407
USPC ........................................................ 343/906
See application file for complete search history.

(56) References Cited

U.S. PATENT DOCUMENTS

| | | |
|---|---|---|
| 7,025,633 B2 | 4/2006 | Kumamoto et al. |
| 7,841,776 B2 | 11/2010 | DiFonzo et al. |
| 8,596,881 B2 | 12/2013 | Umeno |
| 8,622,629 B1 | 1/2014 | Umeno |
| 8,702,316 B2 | 4/2014 | DiFonzo et al. |
| 8,770,857 B2 | 7/2014 | DiFonzo et al. |
| 9,306,328 B2 | 4/2016 | Umeno |
| 9,791,634 B2 | 10/2017 | DiFonzo |

(Continued)

FOREIGN PATENT DOCUMENTS

| | | |
|---|---|---|
| GB | 2291750 A | 1/1996 |
| JP | H07-335286 A | 12/1995 |

(Continued)

*Primary Examiner* — Andrea Lindgren Baltzell
(74) *Attorney, Agent, or Firm* — Oliff PLC (57) ABSTRACT

A connector includes a plug and a receptacle which are fitted to each other and is used to connect a wireless communication module to an electronic apparatus. The plug includes a plurality of contacts. When the plug is connected to the receptacle in any of the first and second directions which are symmetric with respect to the center of a junction surface with the receptacle, the plurality of contacts are connected to contacts of the receptacle.

9 Claims, 5 Drawing Sheets

(56) References Cited

U.S. PATENT DOCUMENTS

2010/0164814 A1\* 7/2010 Imamura ............... H01Q 1/084
 343/702
2013/0115817 A1 5/2013 Terlizzi et al.
2014/0284998 A1\* 9/2014 Brennan ............... B63B 35/00
 307/9.1

FOREIGN PATENT DOCUMENTS

| JP | H08-044834 A | 2/1996 |
| JP | 2003-133847 A | 5/2003 |
| JP | 2004-355820 A | 12/2004 |
| JP | 2005-208418 A | 8/2005 |
| JP | 2006-294349 A | 10/2006 |
| JP | 2010-154469 A | 7/2010 |
| JP | 2012-504312 A | 2/2012 |
| JP | 2013-117660 A | 6/2013 |
| JP | 2013-545256 A | 12/2013 |
| JP | 2014-032956 A | 2/2014 |
| WO | 2010-039656 A1 | 4/2010 |
| WO | 2012-078526 A2 | 6/2012 |

\* cited by examiner

CONNECTOR, WIRELESS COMMUNICATION MODULE, WIRELESS COMMUNICATION DEVICE, AND ELECTRONIC APPARATUS

The entire disclosure of Japanese Patent Application No. 2014-057683, filed Mar. 20, 2014, is expressly incorporated by reference herein.

BACKGROUND

1. Technical Field

The present invention relates to a connector, a wireless communication module, a wireless communication device, and an electronic apparatus.

2. Related Art

In communication using radio waves with high directivity, there is a problem that reception sensitivity is reduced according to the installation position of a communication device. JP-A-2013-117660 discloses a technique in which a driving unit that changes the direction of a receiving device for wirelessly receiving image information is provided to change the direction of the receiving device on the basis of reception sensitivity.

In JP-A-2013-117660, a mechanism for adjusting the direction of the receiving device is needed, which results in an increase in costs.

SUMMARY

An advantage of some aspects of the invention is to provide a connector, a wireless communication module, a wireless communication device, and an electronic apparatus which can achieve good communication conditions, regardless of the installation position.

A connector according to an aspect of the invention includes a plug and a receptacle which are fitted to each other and connects a wireless communication module to an electronic apparatus. The plug includes a plurality of contacts. When the plug is connected to the receptacle in any of the first and second directions which are symmetric with respect to the center of a junction surface with the receptacle, the plurality of contacts are connected to contacts of the receptacle.

According to this configuration, even when the plug is connected to the receptacle in any direction, the contacts are electrically connected to each other. Therefore, it is possible to select the connection direction. As a result, when the direction in which communication conditions are good is selected and the plug is connected to the receptacle, it is possible to achieve good communication conditions, regardless of the installation position.

In the connector according to the aspect of the invention, when the plug is connected to the receptacle in any of the first direction and the second direction, the plurality of contacts may be connected to the contacts of the receptacle to which the same signal lines as those assigned to each of the plurality of contacts are assigned.

According to this configuration, when the plug is connected to the receptacle in any of the first direction and the second direction, the contacts of the plug and the receptacle are electrically connected to each other and it is possible to transmit and receive signals.

A connector according to another aspect of the invention includes a plug and a receptacle which are fitted to each other and connects a wireless communication module to an electronic apparatus. The plug includes a plurality of first contacts which are connected to a power line and a plurality of second contacts which are connected to a grounding line. The plurality of first contacts are arranged at positions which are symmetric with respect to the center of a junction surface with the receptacle. The plurality of second contacts are arranged at positions which are symmetric with respect to the center of the junction surface. When the plug is connected to the receptacle in any of the first and second directions which are symmetric with respect to the center of the junction surface, the plurality of first and second contacts are connected to contacts of the receptacle.

According to this configuration, even when the plug is connected to the receptacle in any direction, the contacts are electrically connected to each other. Therefore, it is possible to select the connection direction. As a result, when the direction in which communication conditions are good is selected and the plug is connected to the receptacle, it is possible to achieve good communication conditions, regardless of the installation position.

In the connector according to the aspect of the invention, the receptacle may include a plurality of third contacts which are connected to the power line and a plurality of fourth contacts which are connected to the grounding line. The plurality of third contacts may be arranged at positions which are symmetric with respect to the center of a junction surface with the plug. The plurality of fourth contacts may be arranged at positions which are symmetric with respect to the center of the junction surface.

According to this configuration, when the plug is connected to the receptacle in any of the first direction and the second direction, the contacts of the plug and the receptacle are electrically connected to each other and it is possible to transmit and receive signals.

In the connector according to the aspect of the invention, when the receptacle is connected to the plug in any of the first direction and the second direction, the plurality of third contacts may be connected to the plurality of first contacts of the plug connected to the power line. When the receptacle is connected to the plug in any of the first direction and the second direction, the plurality of fourth contacts may be connected to the plurality of second contacts of the plug connected to the grounding line.

According to this configuration, when the plug is connected to the receptacle in any of the first direction and the second direction, the contacts of the plug and the receptacle are electrically connected to each other and it is possible to transmit and receive signals.

In the connector according to the aspect of the invention, the plug may include a plurality of fifth contacts which are connected to a pair of differential signal lines used for communication of image data. The receptacle may include a plurality of sixth contacts which are connected to the pair of differential signal lines when the plug is connected to the receptacle in the first direction and a plurality of seventh contacts which are connected to the pair of differential signal lines when the plug is connected to the receptacle in the second direction.

According to this configuration, when the plug is connected to the receptacle in any of the first direction and the second direction, the contacts connected to the pair of differential signal lines can be connected to each other and it is possible to perform the communication of image data using the pair of differential signal lines.

The connector according to the aspect of the invention may further include a plurality of eighth contacts which are connected to a plurality of signal lines for determining whether the connection direction of the plug to the receptacle is the first direction or the second direction.

According to this configuration, it is possible to determine whether the plug is connected to the receptacle in the first direction or the second direction.

In the connector according to the aspect of the invention, the connector may connect a wireless communication module which performs wireless communication using radio waves in a frequency band of 2 GHz or more and the electronic apparatus. In the connector according to the aspect of the invention, the plug may be provided in the wireless communication module and the receptacle may be provided in the electronic apparatus.

According to this configuration, it is possible to connect the wireless communication module and the electronic apparatus using the connector. In particular, when the wireless communication module performs wireless communication using radio waves with directivity, the direction in which communication conditions are good is selected and the plug is connected to the receptacle. Therefore, it is possible to achieve good communication conditions regardless of the installation position.

In the connector according to the aspect of the invention, the plug and the receptacle may include 2×n contacts which are arranged in a matrix of two rows and n columns (n is an even number equal to or greater than 2). At least an (n/2)-th contact from one end of a first row, an ((n/2)+1)-th contact from the one end of the first row, an (n/2)-th contact from one end of a second row, and a ((n/2)+1)-th contact from the one end of the second row may be assigned to the power line.

In the connector according to the aspect of the invention, the plug and the receptacle may include 2×n contacts which are arranged in a matrix of two rows and n columns (n is an odd number equal to or greater than 3). At least an ((n+1)/2)-th contact from one end of a first row and an ((n+1)/2)-th contact from one end of a second row may be assigned to the power line.

In the connector according to the aspect of the invention, the plug and the receptacle may include 2×n contacts which are arranged in a matrix of two rows and n columns (n is a natural number equal to or greater than 2). At least (1+3m)-th (m is an integer equal to or greater than 0) contacts from one end of each of a first row and a second row, which are equal to or less than n, may be assigned to the grounding line.

A wireless communication module according to still another aspect of the invention includes: a body that accommodates a wireless communication circuit; and a plug that is fitted and connected to a receptacle of an electronic apparatus which is a connection target. The plug includes a plurality of contacts. When the plug is connected to the receptacle in any of the first and second directions which are symmetric with respect to the center of a junction surface with the receptacle, the plurality of contacts are connected to contacts of the receptacle.

According to this configuration, the direction in which communication conditions are good is selected and the plug is connected to the receptacle. Therefore, it is possible to achieve good communication conditions, regardless of the installation position.

In the wireless communication module according to the aspect of the invention, the body may include a directional antenna which can perform communication.

According to this configuration, when the wireless communication module performs wireless communication using radio waves with directivity, the direction in which communication conditions are good is selected and the plug is connected to the receptacle. Therefore, it is possible to achieve good communication conditions, regardless of the installation position.

In the wireless communication module according to the aspect of the invention, a plurality of the directional antennas may be provided on one surface of the body.

According to this configuration, when the wireless communication module performs wireless communication using radio waves with directivity, the direction in which communication conditions are good is selected and the plug is connected to the receptacle. Therefore, it is possible to achieve good communication conditions, regardless of the installation position.

A wireless communication device according yet another aspect of the invention is formed by connecting the wireless communication module according to the aspect of the invention and the receptacle which is provided in the body.

According to this configuration, the direction in which communication conditions are good is selected and the plug is connected to the receptacle. Therefore, it is possible to achieve good communication conditions, regardless of the installation position.

An electronic apparatus according to still yet another aspect of the invention includes the wireless communication device according to the aspect of the invention.

According to this configuration, the direction in which communication conditions are good is selected and the plug is connected to the receptacle. Therefore, it is possible to achieve good communication conditions, regardless of the installation position.

According to the aspects of the invention, it is possible to achieve good communication conditions, regardless of the installation position.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, an embodiment of the invention will be described with reference to the accompanying drawings.

Figure 1:
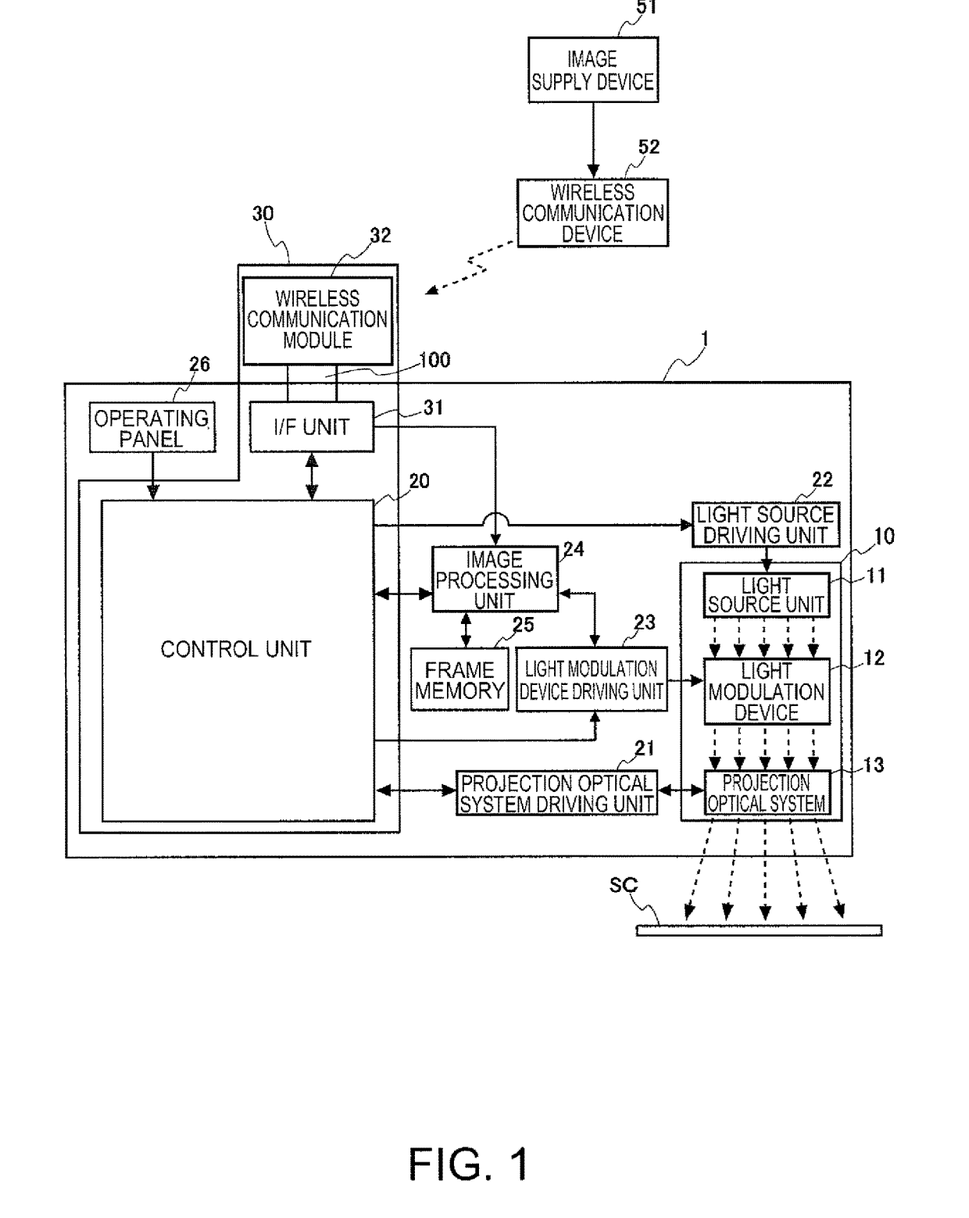
FIG. 1 is a block diagram illustrating an example of the structure of a projector.

First, the structure of this embodiment will be described with reference to FIG. 1. In this embodiment, a projector 1 and an image supply device 51 are connected to each other by wireless communication. A wireless communication module 32 connected to the projector 1 and a wireless communication device 52 connected to the image supply device 51 perform wireless communication therebetween such that image data supplied from the image supply device 51 is transmitted to the projector 1. The projector 1 projects and displays an image based on the image data received from the image supply device 51 on a screen SC. Examples of the image supply device 51 include a video reproduction device, a digital versatile disk (DVD) reproduction device, a television tuner device, a cable television (CATV) set-top box, a video output device of a video game machine, and a personal computer.

The projector 1 includes a wireless transmission device 30. The wireless transmission device 30 includes the wireless communication module 32, an interface unit (hereinafter, abbreviated as an I/F unit) 31, and a connector 100 which connects the wireless communication module 32 and the I/F unit 31, and a control unit 20.

The wireless communication module 32 is connected to the I/F unit 31 provided in the projector 1 through the connector 100 and receives, for example, control data, setting data for setting the operation of the projector 1, and image data which are transmitted from the image supply device 51 by wireless communication. The wireless communication module 32 outputs the received data, such as the control data, the setting data, and the image data, to the control unit 20 or an image processing unit 24 through the I/F unit 31. The wireless communication module 32 and the connector 100 will be described in detail below.

The I/F unit 31 is an interface which transmits and receives various kinds of data to and from an external device such as a PC. The I/F unit 31, for example, receives control data related to image projection and setting data for setting the operation of the projector 1. The I/F unit 31 transmits, for example, the input control data and setting data to the control unit 20. The control unit 20, which will be described below, has a function of transmitting and receiving data to and from the external device through the I/F unit 31. In addition, the I/F unit 31 includes an interface to which image data is input. For example, the I/F unit 31 may include interfaces for image data, such as a High-Definition Multimedia Interface (HDMI: registered trademark), DisplayPort (trademark), and CoaxPress (registered trademark). In addition, the I/F unit 31 may include an interface to which audio data is input. The I/F unit 31 transmits the input image data to the image processing unit 24. In particular, when the interface for image data, such as HDMI, is provided in the I/F unit 31, for example, the image supply device 51 can transmit HDMI video data or audio data to the projector 1, without converting the data into other formats.

The projector 1 according to this embodiment projects the image based on the image data which is input through the I/F unit 31. The image data may be digital image data or analog image data. When an image based on analog image data is projected, the I/F unit 31 may include an interface for an analog image and an A/D conversion circuit which converts an analog image signal into digital image data.

The projector 1 includes a projection unit 10 which forms an optical image. The projection unit 10 includes a light source unit 11, a light modulation device 12, and a projection optical system 13.

The light source unit 11 includes a light source, such as a xenon lamp, an extra-high-pressure mercury lamp, a light emitting diode (LED), or a laser light source. In addition, the light source unit 11 may include a reflector and an auxiliary reflector which guide light emitted from the light source to the light modulation device 12. Furthermore, the light source unit 11 may include, for example, a lens group (not shown) for improving the optical characteristics of projection light, a polarizing plate, or a dimming element which reduces the amount of light emitted from the light source on a path to the light modulation device 12.

The light modulation device 12 includes, for example, three transmissive liquid crystal panels corresponding to the three primary colors, that is, R, G, and B, modulates light transmitted through the liquid crystal panels, and generates image light. Light emitted from the light source unit 11 is separated into three color light components, that is, R, G, and B light components and the three color light components are incident on the corresponding liquid crystal panels. The color light components which have passed through the liquid crystal panels and then modulated are composed by a composition optical system, such as a cross dichroic prism, and the composite light is emitted to the projection optical system 13.

The projection optical system 13 includes a lens group which guides the image light modulated by the light modulation device 12 to the screen SC and focuses the image light on the screen SC. In addition, the projection optical system 13 may include a zoom mechanism which magnifies or reduces the image to be projected onto the screen SC and adjusts the focal point and a focus adjustment mechanism which adjusts the focus. When the projector 1 is a short focus type, the projection optical system 13 may include a concave mirror which reflects the image light to the screen SC.

The projection unit 10 is connected to a projection optical system driving unit 21, a light source driving unit 22, and a light modulation device driving unit 23. The projection optical system driving unit 21 drives each motor included in the projection optical system 13 under the control of the control unit 20. The light source driving unit 22 drives the light source included in the light source unit 11 under the control of the control unit 20. The light modulation device driving unit 23 drives the light modulation device 12 under the control of the control unit 20.

The control unit 20 includes, for example, a central processing unit (CPU), a random access memory (RAM) which is used to temporarily store various kinds of data, and a non-volatile read only memory (ROM). In the control unit 20, the CPU operates according to a control program stored in the ROM to control the overall operation of the projector 1. That is, the control unit 20 functions as a computer.

The operating panel 26 corresponds to an operation receiving unit which receives a key operation of the user and includes a plurality of operation keys which are used by the user to input various instructions to the projector 1.

When the user operates various operation keys of the operating panel 26, the operating panel 26 receives the operation and outputs a control signal corresponding to the operated operation key to the control unit 20. Then, when the control signal is input from the operating panel 26, the control unit 20 performs a process based on the input control signal to control the operation of the projector 1. In addition, a remote controller (not shown) which can be remotely operated may be used as an input operation unit, instead of the operating panel 26 or in addition to the operating panel 26. In this case, the remote controller sends an operation signal, such as an infrared signal, corresponding to the user's operation and a remote control signal receiving unit (not shown) receives the operation signal and transmits the operation signal to the control unit 20.

The projector 1 includes the image processing unit 24.

The image processing unit 24 processes the image data which is input through the I/F unit 31 and outputs an image signal to the light modulation device driving unit 23, under the control of the control unit 20. The image processing unit 24 performs, for example, the following processes: a process of distinguishing a 3D (stereoscopic) image and a 2D (plane) image; a resolution conversion process; a frame rate conversion process; a distortion correction process; a digital zoom process; a color correction process; and a brightness correction process. The image processing unit 24 performs the process designated by the control unit 20 and performs the process using the parameter input from the control unit 20, if necessary. In addition, the image processing unit 24 may perform combinations of the plurality of processes.

In addition, the image processing unit 24 is connected to a frame memory 25. The image processing unit 24 develops the image data input from the I/F unit 31 in the frame memory 25 and performs the above-mentioned various processes on the developed image data. The image processing unit 24 reads the processed image data from the frame memory 25, generates R, G, and B image signals corresponding to the image data, and outputs the R, G, and B image signals to the light modulation device driving unit 23. The light modulation device driving unit 23 connected to a liquid crystal panel of the light modulation device 12 drives the liquid crystal panel on the basis of the image signals input from the image processing unit 24 such that an image is drawn on each liquid crystal panel.

Figure 2A:
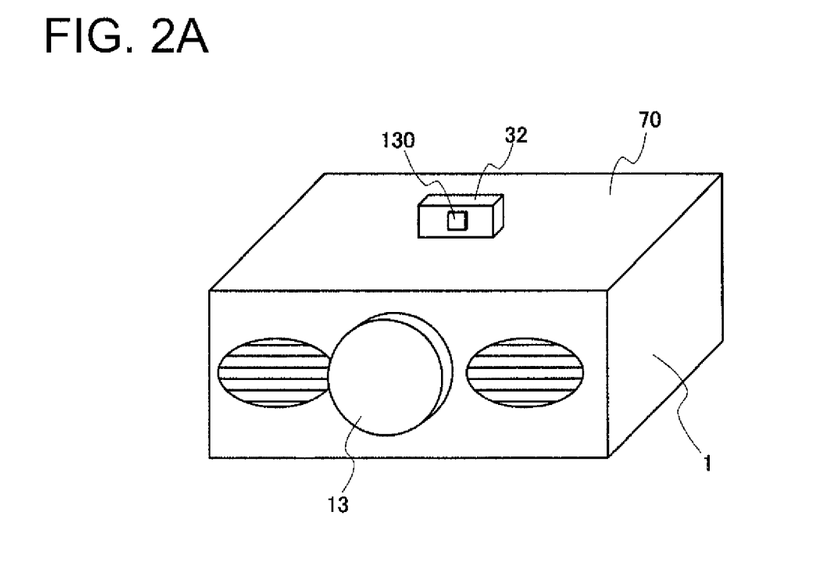
FIG. 2A is a diagram illustrating a state in which a wireless communication module is attached to the projector.
Figure 2B:
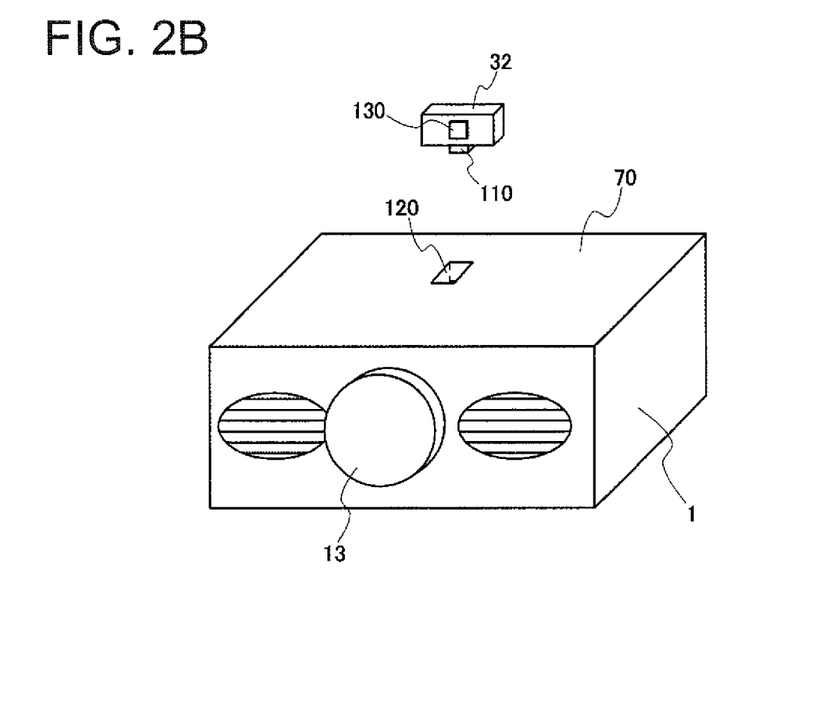
FIG. 2B is a diagram illustrating a state in which the wireless communication module is detached from the projector.

Next, the wireless communication module 32 and the connector 100 will be described with reference to FIGS. 2A to 5. First, the connection of the wireless communication module 32 to the projector 1 will be described with reference to FIGS. 2A and 2B. FIG. 2A shows a state in which the wireless communication module 32 is connected to the projector 1 and FIG. 2B shows a state in which the wireless communication module 32 is disconnected from the projector 1.

The projector 1 and the wireless communication module 32 are connected by the connector 100. The connector 100 includes a male connector 110 which is attached to the wireless communication module 32 and a female connector 120 which is attached to a housing 70 of the projector 1. The male connector 110 is fitted to the female connector 120, so that the projector 1 and the wireless communication module 32 are electrically connected to each other. The male connector 110 is detached from the female connector 120, so that the projector 1 is electrically disconnected from the wireless communication module 32 and the wireless communication module 32 is detached from the projector 1. The male connector 110 may be provided in the projector 1 and the female connector 120 may be provided in the wireless communication module 32.

The female connector 120 is provided in the upper surface of the housing 70 which accommodates the body of the projector 1. Therefore, when the wireless communication module 32 is connected to the projector 1, it is arranged on the upper surface of the projector 1. In this embodiment, the female connector 120 is provided in the upper surface of the housing 70. However, the position where the female connector 120 is provided is not limited to the upper surface. The female connector 120 may be provided in, for example, the front surface, side surface, or rear surface of the housing 70.

Figure 3A:
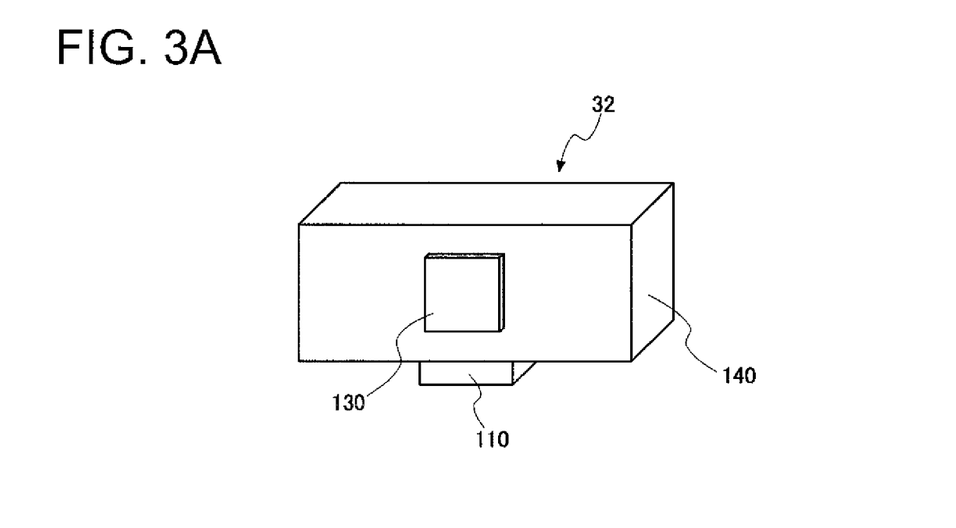
FIG. 3A is a diagram illustrating the structure of a wireless communication module including one antenna unit.

FIG. 3A is a perspective view illustrating the wireless communication module 32. The wireless communication module 32 is configured as a module and includes an antenna unit 130 and a module body portion 140. The antenna unit 130 is provided on the front surface of the module body portion 140. The antenna unit 130 includes a directional antenna. The wireless communication device 52 connected to the image supply device 51 and the wireless communication module 32 perform communication therebetween using, for example, WirelessHD (registered trademark) which is a wireless communication interface standard. In WirelessHD, radio waves in a frequency band of 60 GHz are used as communication radio waves. In communication using millimeter waves, the communication direction (range) is limited. Therefore, in the communication using millimeter waves, directional antennas are used and the antenna of the antenna unit 130 and the antenna of the wireless communication device 52 are arranged so as to face each other in a direction in which directivity is high, which makes it possible to effectively exchange data. In addition, radio waves in a frequency band of 2 GHz or more can be used in the wireless communication between the wireless communication device 52 and the wireless communication module 32. For example, communication may be performed, using radio waves which are used in a 2.4-GHz or 5-GHz wireless local area network (LAN) as the communication radio waves and Miracast (registered trademark) as the communication standard.

The module body portion 140 includes a radio frequency (RF) unit and a baseband processing unit. The RF unit up-converts a baseband signal into a radio frequency signal and outputs the radio frequency signal from the antenna during a transmission process. In addition, the RF unit down-converts the radio frequency signal received from the antenna into a baseband signal during a receiving process. The baseband processing unit performs, for example, modulation and demodulation processes on the baseband signal.

Figure 3B:
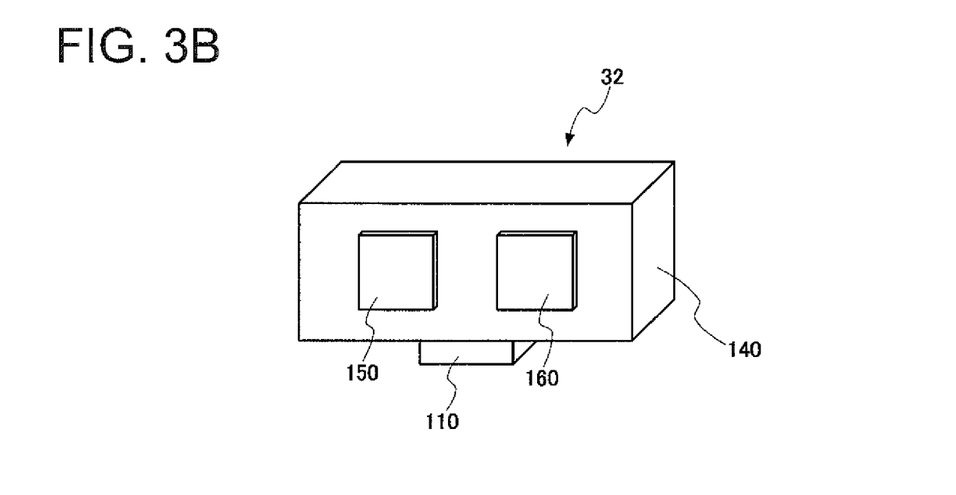
FIG. 3B is a diagram illustrating the structure of a wireless communication module including two antenna units.

FIG. 3B is a perspective view illustrating another structure of the wireless communication module 32. In the wireless communication module 32 shown in FIG. 3B, two antenna units 150 and 160 are provided on the front surface of the module body portion 140. That is, the two antenna units 150 and 160 are provided on the same surface of the module body portion 140. Two RF units and two baseband processing units may be provided in the module body portion 140, similarly to the antenna units 150 and 160. The radio waves received by each of the antenna units 150 and 160 may be processed by each RF unit and each baseband processing unit. When the two antenna units 150 and 160 are provided, for example, the antenna unit 150 can transmit or receive radio waves in a frequency band of 60 GHz and the antenna unit 160 can transmit or receive radio waves in a frequency band of 2.4 GHz. In addition, both of the antenna units 150 and 160 may transmit and receive radio waves in a frequency band of 60 GHz. For example, the radio waves of different channels may be transmitted and received through the antenna unit 150 and the antenna unit 160. Two systems may be used to transmit and receive one stream of image data. For example, the wireless communication device 52 which is a data transmitter side divides the image data to be transmitted into two image data items and transmits the divided image data items at the same time, using two antennas provided in two wireless communication devices 52. The wireless communication module 32 receives the image data items transmitted from the wireless communication device 52 using the antenna units 150 and 160 and synthesizes the image data items received by the antenna units 150 and 160 using the baseband processing unit of the module body portion 140. Therefore, it is possible to broaden the communication band to a degree and to increase the communication speed. For example, when one system is used to transmit one stream of image data, it is possible to transmit a 1080p video. When two systems are used to transmit one stream of image data, it is possible to transmit a 4 k video.

Figure 4A:
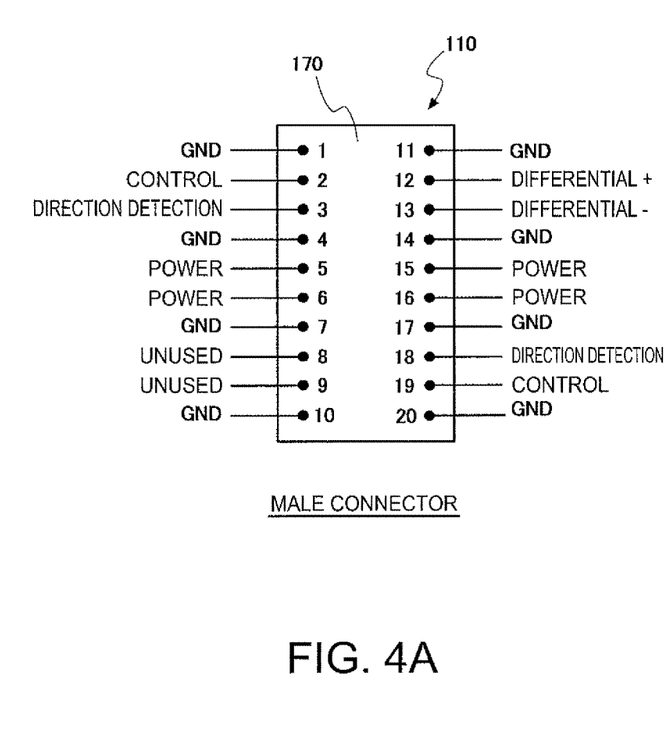
FIG. 4A is a diagram illustrating an example of the pin assignment of a male connector.
Figure 4B:
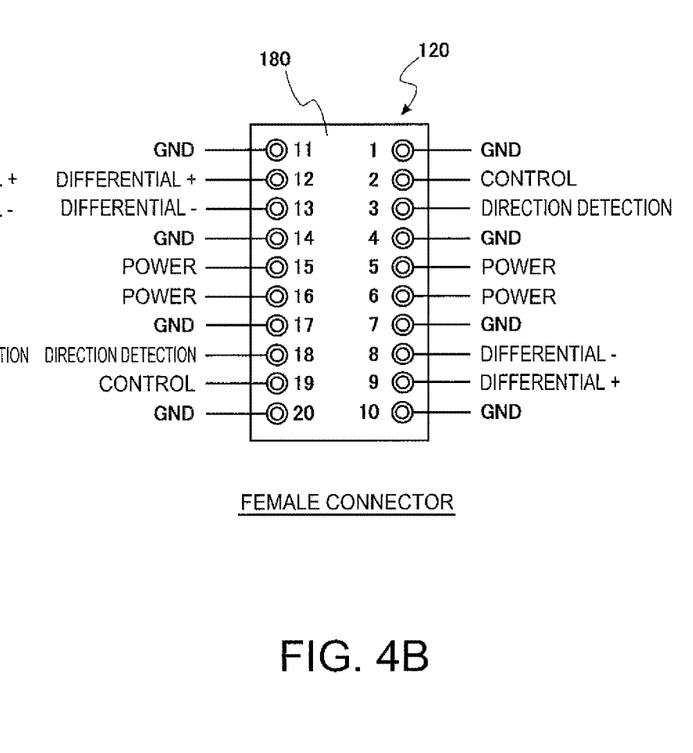
FIG. 4B is a diagram illustrating an example of the pin assignment of a female connector.

Next, the assignment (pin assignment) of connection terminals (contacts) included in the male connector 110 and the female connector 120 will be described with reference to FIGS. 4A and 4B. FIG. 4A shows an example of the pin assignment of the connection terminals included in the male connector 110 and FIG. 4B shows an example of the pin assignment of the connection terminals included in the female connector 120. The male connector 110 and the female connector 120 each include 20 terminals.

The connection terminals (first contacts) with terminal number 5, 6, 15, and 16 in the male connector 110 are connected to a power line. The connection terminals (second contacts) with terminal numbers 1, 4, 7, 10, 11, 14, 17, and 20 are connected to a grounding line. The connection terminals (fifth contacts) with terminal numbers 12 and 13 are connected to a differential signal line. The connection terminal with terminal number 12 is connected to the positive (+) side of the differential signal line and the connection terminal with terminal number 13 is connected to the negative (−) side of the differential signal line. The connection terminals with terminal numbers 2 and 19 are connected to a control signal line. The connection terminal (eighth terminals) with terminal numbers 3 and 18 are used as direction detecting terminals. The connection terminals with terminal numbers 8 and 9 are not assigned or used. The direction detecting terminal will be described in detail below. The differential signal line is used to transmit image data. In the following description, a line which includes the differential signal line and is used to transmit the image data is referred to as an "image signal line".

The connection terminals (third contacts) with terminal numbers 5, 6, 15, and 16 in the female connector 120 are connected to the power line. The connection terminals (fourth contacts) with terminal numbers 1, 4, 7, 10, 11, 14, 17, and 20 are connected to the grounding line. The connection terminals (seventh contacts) with terminal numbers 8 and 9 and the connection terminals (sixth contacts) with terminal numbers 12 and 13 are connected to differential signal lines. The connection terminals with terminal numbers 9 and 12 are connected to the positive (+) side of the differential signal line and the connection terminals with terminal numbers 8 and 13 are connected to the negative (−) side of the differential signal line. The connection terminals with terminal numbers 2 and 19 are connected to the control signal lines. The connection terminals (eighth terminals) with terminal numbers 3 and 18 are used as the direction detecting terminals.

The connector 100 according to this embodiment is configured such that the male connector 110 can be connected to the female connector 120 in a frontward direction (first direction) or a rearward direction (second direction) which is rotated 180 degrees with respect to the frontward direction. The frontward direction is a direction in which the antenna unit 130 faces the front side of the projector 1 (the side on which the projection optical system 13 is provided). The rearward direction is a direction in which the antenna unit 130 faces the rear side of the projector 1 and is obtained by rotating the male connector 110 by 180 degrees with respect to the frontward direction. In the following description, the connection between the male connector 110 and the female connector 120 with the antenna unit 130 facing the front side is referred to as a front connection and the connection between the connector 110 and the female connector 120 with the antenna unit 130 facing the rear side is referred to as a rear connection.

When the projector 1 is mounted on the wall or is hung from the ceiling, in some cases, it is difficult to change the direction of the projector 1 in order to increase the reception sensitivity of the wireless communication module 32. In particular, when communication is performed using radio waves with high directivity, in some cases, it is difficult to achieve good communication conditions because of the relationship with the installation position of the image supply device 51. Therefore, in this embodiment, the wireless communication module 32 can be connected to the front or rear side of the projector 1 such that reception conditions are improved, without changing the direction of the projector 1.

In the case of the front connection, the connection terminals with the same terminal numbers in the male connector 110 and the female connector 120 are connected to each other. For example, the connection terminal with terminal number 1 in the male connector 110 is connected to the connection terminal with terminal number 1 in the female connector 120. Similarly, the connection terminals with terminal numbers 2, 3, 4, . . . , 8, 9, and 10 in the male connector 110 are connected to the connection terminals with terminal numbers 2, 3, 4, . . . , 8, 9, and 10 in the female connector 120, respectively. The connection terminals with terminal numbers 11, 12, 13, . . . , 18, 19, and 20 in the male connector 110 are connected to the connection terminals with terminal numbers 11, 12, 13, . . . , 18, 19, and 20 in the female connector 120, respectively. When the corresponding connection terminals of the male connector 110 are inserted into each connection terminal of the female connector 120, the same signal lines as those assigned to the inserted connection terminals are assigned to the connection terminals of the female connector 120. For example, since the connection terminals with terminal numbers 5, 6, 15, and 16 in the male connector 110 are connected to the power line, the connection terminals with terminal numbers 5, 6, 15, and 16 in the female connector 120 are also connected to the power line. The connection terminals with terminal numbers 1, 4, 7, 10, 11, 14, 17, and 20 in the male connector 110 are connected to the grounding line. Therefore, the connection terminals with terminal numbers 1, 4, 7, 10, 11, 14, 17, and 20 in the female connector 120 are also connected to the grounding line. In the male connector 110, the connection terminal with terminal number 12 is connected to the positive (+) side of the differential signal line and the connection terminal with terminal number 13 is connected to the negative (−) side of the differential signal line. Therefore, in the female connector 120, the connection terminal with terminal number 12 is connected to the positive (+) side of the differential signal line and the connection terminal with terminal number 13 is connected to the negative (−) side of the differential signal line.

Figure 5:
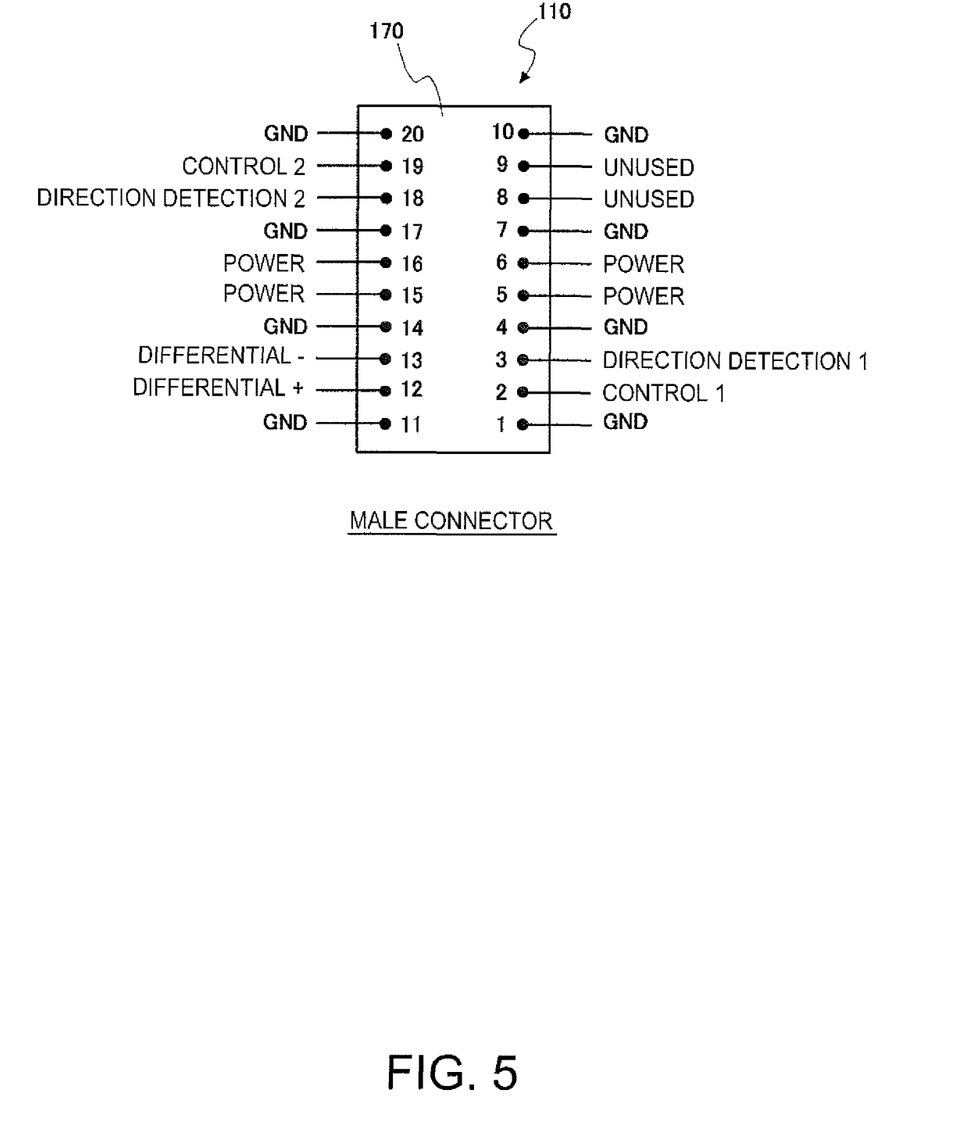
FIG. 5 is a diagram illustrating a state in which the male connector is rotated 180 degrees.

FIG. 5 shows a case in which the male connector 110 shown in FIG. 4A is rotated 180 degrees. In the case of the rear connection, the connection terminal with terminal number 20 in the male connector 110 is connected to the connection terminal with terminal number 1 in the female connector 120. Similarly, the connection terminals with terminal numbers 19, 18, 17, . . . , 13, 12, and 11 in the male connector 110 are connected to the connection terminals with terminal numbers 2, 3, 4, . . . , 8, 9, and 10 in the female connector 120, respectively. The connection terminals with terminal numbers 10, 9, 8, . . . , 3, 2, and 1 in the male connector 110 are connected to the connection terminals with terminal numbers 11, 12, 13, . . . , 18, 19, and 20 in the female connector 120, respectively. In the rear connection, when the corresponding connection terminals of the male connector 110 are inserted into each connection terminal of the female connector 120, the same signal lines as those assigned to the inserted connection terminals are assigned to the connection terminals of the female connector 120. For example, the connection terminals with terminal numbers 5, 6, 15, and 16 in the male connector 110 which are connected to the power line are connected to the connection terminals with terminal numbers 16, 15, 6, and 5 in the female connector 120 which are connected to the power line, respectively. The connection terminals with terminal numbers 1, 4, 7, 10, 11, 14, 17, and 20 in the male connector 110 which are connected to the grounding line are connected to the connection terminals with terminal numbers 20, 17, 14, 11, 10, 7, 4, and 1 in the female connector 120 which are connected to the grounding line, respectively. The connection terminals with terminal numbers 2 and 19 in the male connector 110 which are connected to the control signal lines are connected to the connection terminals with terminal numbers 19 and 2 in the female connector 120 which are connected to the control signal lines, respectively. The connection terminal with terminal number 12 in the male connector 110 which is connected to the positive (+) side of the differential signal line is connected to the connection terminal with terminal number 9 in the female connector 120 which is connected to the positive (+) side of the differential signal line. Similarly, the connection terminal with terminal number 13 in the male connector 110 which is connected to the negative (−) side of the differential signal line is connected to the connection terminal with terminal number 8 in the female connector 120 which is connected to the negative (−) side of the differential signal line. The connection terminal with terminal number 18, which is the direction detecting terminal of the male connector 110, is connected to the connection terminal with terminal number 3, which is the direction detecting terminal of the female connector 120. Similarly, the connection terminal with terminal number 3, which is the direction detecting terminal of the male connector 110, is connected to the connection terminal with terminal number 18, which is the direction detecting terminal of the female connector 120.

It is assumed that the connector 100 includes the male connector 110 and the female connector 120 each having 2×n contacts which are arranged in a matrix of two rows and n columns (n is an even number equal to or greater than 2). In this case, at least an (n/2)-th connection terminal from one end of the first row, an ((n/2)+1)-th connection terminal from the one end of the first row, an (n/2)-th connection terminal from one end of the second row, and an ((n/2)+1)-th connection terminal from the one end of the second row are assigned to the power line. For example, in the example shown in FIGS. 4A and 4B, the first row includes the connection terminals with terminal numbers 1 to 10 and the second row includes the connection terminals with terminal numbers 11 to 20. When n is 10, the (n/2)-th connection terminal in the first row is the connection terminal with terminal number 5 and the ((n/2)+1)-th connection terminal in the first row is the connection terminal with terminal number 6. The (n/2)-th connection terminal in the second row is the connection terminal with terminal number 15 and the ((n/2)+1)-th connection terminal in the second row is the connection terminal with terminal number 16.

It is assumed that a connector includes the male connector 110 and the female connector 120 each having 2×n contacts which are arranged in a matrix of two rows and n columns (n is a natural number equal to or greater than 2). In this case, at least (1+3m)-th (m is an integer equal to or greater than 0) connection terminals in the first row and the second row, which are equal to or less than n, are assigned to the grounding line. In the example shown in FIGS. 4A and 4B, since n is 10, the connection terminals with terminal numbers 1, 4, 7, and 10 in the first row and the connection terminals with terminal numbers 11, 14, 17, and 20 in the second row are assigned to the grounding line.

FIGS. 4A and 4B show the male connector 110 and the female connector 120 each having the connection terminals which are arranged in a matrix of two rows and ten columns. However, the connector 100 may include odd columns of connection terminals, for example, two rows and seven columns of connection terminals. That is, it is assumed that a connector includes the male connector 110 and the female connector 120 each having 2×n contacts which are arranged in a matrix of two rows and n columns (n is an odd number equal to or greater than 3). In this case, at least an ((n+1)/2)-th connection terminal from one end in the first row and an ((n+1)/2)-th connection terminal from one end of the second row are assigned to the power line.

It is assumed that the connector 100 includes the female connector 120 having 2×n contacts which are arranged in a matrix of two rows and n columns (n is a natural number equal to or greater than 2). In this case, at least an (n−l)-th connection terminal (l is a natural number that is equal to or greater than 1 and equal to or less than n−1) from one end of the first row and an (n−l+1)-th connection terminal from the one end of the first row are assigned to the differential signal lines. An l-th connection terminal from one end of the second row and an (l+1)-th connection terminal from the one end of the second row are assigned to the differential signal lines. For example, in the example shown in FIGS. 4A and 4B, when the first row includes the connection terminals with terminal numbers 1 to 10 and the second row includes the connection terminals with terminal numbers 11 to 20, n is 10. In this case, when l is 2, the connection terminal with terminal number 8 in the first row, the connection terminal with terminal number 9 in the first row, the connection terminal with terminal number 12 in the second row, and the connection terminal with terminal number 13 in the second row are assigned to the differential signal lines.

It is assumed that the connector 100 includes the female connector 120 having 2×n contacts which are arranged in a matrix of two rows and n columns (n is a natural number equal to or greater than 2). When one image signal line is used to transmit image data, at least an (n−k)-th connection terminal (k is a natural number that is equal to or greater than 0 and equal to or less than n−1) from one end of the first row and a (k+1)-th connection terminal from one end of the second row may be assigned to the image signal line. For example, in the example shown in FIGS. 4A and 4B, when the first row includes the connection terminals with terminal numbers 1 to 10 and the second row includes the connection terminals with terminal numbers 11 to 20, n is 10. In this case, when k is 1, the connection terminal with terminal number 9 in the first row and the connection terminal with terminal number 12 in the second row are assigned to the image signal line.

It is assumed that the connector 100 includes the male connector 110 having 2×n contacts which are arranged in a matrix of two rows and n columns (n is a natural number equal to or greater than 2). In this case, at least an (n−j)-th connection terminal (j is a natural number that is equal to or greater than 1 and equal to or less than n−1) from one end of the first row and an (n−j+1)-th connection terminal from the one end of the first row are not assigned or used. A j-th connection terminal from one end of the second row and a (j+1)-th connection terminal (l is a natural number that is equal to or greater than 0 and equal to or less than n/2) from the one end of the second row are assigned to the differential signal lines. In the example shown in FIGS. 4A and 4B, when the first row includes the connection terminals with terminal numbers 1 to 10 and the second row includes the connection terminals with terminal numbers 11 to 20, n is 10. In this case, when l is 2, the connection terminal with terminal number 8 in the first row and the connection terminal with terminal number 9 in the first row are not used. The connection terminal with terminal number 12 in the second row and the connection terminal with terminal number 13 in the second row are assigned to the differential signal lines.

It is assumed that the connector 100 includes the male connector 110 having 2×n contacts which are arranged in a matrix of two rows and n columns (n is a natural number equal to or greater than 2) and one image signal line is used to transmit image data. In this case, at least an (n−i)-th connection terminal (i is a natural number that is equal to or greater than 0 and equal to or less than n−1) from one end of the first row may not be assigned or used and an (i+1)-th connection terminal from one end of the second row may be assigned to the image signal line. For example, in the example shown in FIGS. 4A and 4B, when the first row includes the connection terminals with terminal numbers 1 to 10 and the second row includes the connection terminals with terminal numbers 11 to 20, n is 10. In this case, when i is 1, the connection terminal with terminal number 9 in the first row is not used and the connection terminal with terminal number 12 in the second row is assigned to the image signal line.

Next, the pin assignment of the male connector 110 and the female connector 120 which enables the front connection and the rear connection will be described.

Referring to FIGS. 4A and 4B, the power line of the male connector 110 is assigned to the connection terminal at the center of rotation in a junction surface 170 of the male connector 110 when the male connector 110 is fitted to the female connector 120. Similarly, the power line of the female connector 120 is assigned to the connection terminal at the center of rotation in a junction surface 180 with the male connector 110. In this embodiment, the power line is connected to the connection terminals with terminal numbers 5, 6, 15, and 16 in the male connector 110 and the female connector 120. The connection terminals with terminal numbers 5, 6, 15, and 16 in the male connector 110 are arranged in the junction surface 170 so as to be symmetric with respect to a point. Similarly, the connection terminals with terminal numbers 5, 6, 15, and 16 in the female connector 120 are arranged in the junction surface 180 so as to be symmetric with respect to a point.

In the male connector 110, the differential signal line is connected to the connection terminals with terminal numbers 12 and 13. In the female connector 120, the differential signal line is connected to the connection terminals with terminal numbers 8 and 9, in addition to the connection terminals with terminal numbers 12 and 13. When the male connector 110 is connected in the frontward direction, the connection terminals with terminal numbers 12 and 13 in the male connector 110 are connected to the connection terminals with terminal numbers 12 and 13 in the female connector 120, respectively. When the male connector 110 is connected in the rearward direction, the connection terminals with terminal numbers 12 and 13 in the male connector 110 are connected to the connection terminals with terminal numbers 8 and 9 in the female connector 120, respectively. That is, the connection terminals with terminal numbers 8, 9, 12, and 13 in the female connector 120 which are connected to the differential signal lines are arranged in the junction surface 180 so as to be symmetric with respect to a point. As such, in this embodiment, the connection terminals with terminal numbers 8 and 9 and the connection terminals with terminal numbers 12 and 13 are provided as the connection terminals connected to a pair of differential signal lines in the female connector 120. Therefore, when the male connector 110 is connected in the frontward direction or the rearward direction, the connection terminals of the male connector 110 which are assigned to a pair of differential signal lines can be connected to the connection terminals of the female connector 120 which are assigned to a pair of differential signal lines.

Next, the determination of the connection direction of the male connector 110 using the direction detecting terminals will be described. When the male connector 110 and the female connector 120 are connected to each other and the wireless communication module 32 is connected to the projector 1, the wireless communication module 32 outputs a voltage with a predetermined level from the connection terminal with terminal number 3 and the connection terminal with terminal number 18. The control unit 20 of the projector 1 determines whether the wireless communication module 32 is connected in the frontward direction or the rearward direction on the basis of the voltages input from the connection terminal with terminal number 3 and the connection terminal with terminal number 18. For example, when the voltage input from the connection terminal with terminal number 3 is +5 V and the voltage input from the connection terminal with terminal number 18 is 0 V, the control unit 20 of the projector 1 determines that the wireless communication module 32 has been connected in the frontward direction. On the other hand, when the voltage input from the connection terminal with terminal number 3 is 0 V and the voltage input from the connection terminal with terminal number 18 is +5 V, the control unit 20 of the projector 1 determines that the wireless communication module 32 has been connected in the rearward direction.

In addition, the communication method between the wireless communication module 32 and the wireless communication device 52 may be determined using the direction detecting terminals. For example, when the wireless communication module 32 which receives millimeter waves using, for example, WirelessHD is connected to the projector 1, the wireless communication module 32 outputs a predetermined signal to the projector 1 through the signal line connected to the direction detecting terminal. When the wireless communication module 32 which receives 2.4-GHz or 5-GHz radio waves using, for example, Miracast, is connected, the wireless communication module 32 does not output a predetermined signal to the signal line connected to the direction detecting terminal.

The connection terminals with terminal numbers 2 and 19 in the male connector 110 which are connected to the control signal line may be connected to the same control signal line. That is, one control signal line may be branched into two lines and the branched lines may be connected to the connection terminal with terminal number 2 and the connection terminal with terminal number 19. This structure holds the connection terminals with terminal numbers 2 and 19 in the female connector 120. This connection does not cause any problem in the control signal line with a low data transmission speed. However, a pair of differential signal lines which transmit data at a high speed are not capable of being configured such that the signal line is branched into two signal lines and the branched signal lines are connected to two connection terminals, unlike the control signal line. For example, it is assumed that the male connector 110 includes a total of four connection terminals, that is, two connection terminals connected to the positive differential signal line and two connection terminals connected to the negative differential signal line. That is, it is assumed that a pair of differential signal lines are assigned to the unused connection terminals with terminal numbers 8 and 9 in the male connector 110. It is assumed that the positive differential signal line is branched into two lines and the branched lines are connected to the connection terminal with terminal number 9 and the connection terminal with terminal number 12 in the male connector 110. In addition, it is assumed that the positive differential signal line is branched into two lines and the branched lines are connected to the connection terminal with terminal number 9 and the connection terminal with terminal number 12 in the female connector 120. Similarly, it is assumed that the negative differential signal line is branched into two lines and the branched lines are connected to the connection terminal with terminal number 8 and the connection terminal with terminal number 13 in the male connector 110. It is assumed that the negative differential signal line is branched into two lines and the branched lines are connected to the connection terminal with terminal number 8 and the connection terminal with terminal number 13 in the female connector 120. When connection is performed in this way, both of the connection terminals with terminal numbers 8 and 9 and the connection terminals with terminal numbers 12 and 13 are connected to the pair of differential signal lines. Therefore, in some cases, a differential signal which is received through the connection terminals on one side, for example, the connection terminal with terminal numbers 8 and 9 is reflected and returns to the transmitter side through the connection terminals on the other side, that is, the connection terminals with terminal numbers 12 and 13. For this reason, this embodiment is configured such that two pairs of connection terminals connected to the pair of differential signal lines are provided only in the female connector 120 and one of the two pairs of connection terminals is selectively connected to the pair of differential signal lines.

As described in detail above, in this embodiment, when the male connector 110 is connected to the female connector 120 in the frontward direction or the rearward direction, the connection terminals of the male and female connectors 110 and 120 are electrically connected to each other. The male connector 110 is provided in the wireless communication module 32 including the antenna and the female connector 120 is provided in the projector 1. Therefore, the direction in which communication conditions are good is selected and the male connector 110 is connected to the female connector 120. As a result, it is possible to achieve good communication conditions even when the directivity of the radio waves received by the antenna is high.

According to the above-described embodiment, the following effect is obtained.

The connector 100 includes the male connector 110 and the female connector 120 which are fitted to each other and is used to connect the wireless communication module 32 to the projector 1. The male connector 110 includes a plurality of contacts. When the male connector 110 is connected to the female connector 120 in any of the frontward direction and the rearward direction which are symmetric with respect to the center of the junction surface with the female connector 120, the plurality of connection terminals are connected to the connection terminals of the female connector 120. Therefore, even when the male connector 110 is connected to the female connector 120 in any direction, the contacts are electrically connected to each other. Thus, it is possible to select the connection direction. As a result, the direction in which the communication conditions are good is selected and the male connector 110 is connected to the female connector 120, which makes it possible to achieve good communication conditions, regardless of the installation position.

When the male connector 110 is connected in any of the frontward direction and the rearward direction, the plurality of connection terminals of the male connector 110 are connected to the connection terminals of the female connector 120 to which the same signal lines as those assigned to the connection terminals of the male connector 110 are assigned. Therefore, when the male connector 110 is connected to the female connector 120 in any of the frontward direction and the rearward direction, the contacts of the male connector 110 and the female connector 120 are electrically connected to each other and it is possible to transmit and receive signals.

The connector 100 includes the male connector 110 and the female connector 120 which are fitted to each other and is used to connect the wireless communication module 32 to the projector 1. The male connector 110 includes a plurality of first contacts which are connected to the power line and a plurality of second contacts which are connected to the grounding line. The plurality of first contacts are arranged at positions that are symmetric with respect to the center of the junction surface with the female connector 120 and the plurality of second contacts are arranged at positions that are symmetric with respect to the center of the junction surface. When the female connector 120 is connected in any of the first and second directions which are symmetric with respect to the center of the junction surface, the plurality of first and second contacts are connected to the contacts of the female connector 120. Therefore, even when the male connector 110 is connected to the female connector 120 in any direction, the contacts are electrically connected to each other and it is possible to select the connection direction. As a result, the direction in which communication conditions are good is selected and the male connector 110 is connected to the female connector 120, which makes it possible to achieve good communication conditions, regardless of the installation position.

The female connector 120 of the connector 100 includes a plurality of third contacts which are connected to the power line and a plurality of fourth contacts which are connected to the grounding line. The plurality of third contacts are arranged at positions that are symmetric with respect to the center of a junction surface with a plug and the plurality of fourth contacts are arranged at positions that are symmetric with respect to the center of the junction surface. Therefore, even when the male connector 110 is connected to the female connector 120 in any of the frontward direction and the rearward direction, the contacts of the male connector 110 and the female connector 120 are electrically connected to each other and it is possible to transmit and receive signals.

When the female connector 120 is connected to the male connector 110 in any of the frontward direction and the rearward direction, the plurality of third contacts are connected to the plurality of first contacts of the male connector 110 which are connected to the power line. When the female connector 120 is connected to the male connector 110 in any of the frontward direction and the rearward direction, the plurality of fourth contacts are connected to the plurality of second contacts of the male connector 110 which are connected to the grounding line.

Therefore, when the male connector 110 is connected to the female connector 120 in any of the frontward direction and the rearward direction, the contacts of the male connector 110 and the female connector 120 are electrically connected to each other and it is possible to transmit and receive signals.

The male connector 110 includes a plurality of fifth contacts which are connected to a pair of differential signal lines used for the communication of image data. In addition, the female connector 120 includes a plurality of sixth contacts and a plurality of seventh contacts. When the male connector 110 is connected to the female connector 120 in the frontward direction, the plurality of sixth contacts are connected to the pair of differential signal lines. When the male connector 110 is connected to the female connector 120 in the rearward direction, the plurality of seventh contacts are connected to the pair of differential signal lines. When the male connector 110 is connected to the female connector 120 in any of the frontward direction and the rearward direction, it is possible to connect the contacts connected to the pair of differential signal lines and perform the communication of image data using the pair of differential signal lines.

The connector includes a plurality of eighth contacts which are connected to a plurality of signal lines for determining whether the connection direction of the male connector 110 to the female connector 120 is in the frontward direction or the rearward direction. Therefore, it is possible to determine whether the male connector 110 is connected to the female connector 120 in the frontward direction or the rearward direction.

The connector 100 connects the projector 1 and the wireless communication module 32 which performs wireless communication using radio waves in a frequency band of 2 GHz or higher. In the connector according to the embodiment of the invention, the male connector 110 is provided in the wireless communication module 32 and the female connector 120 is connected to the projector 1. Therefore, it is possible to connect the wireless communication module 32 and the projector 1 using the connector 100. In particular, when the wireless communication module 32 uses radio waves with directivity, the direction in which communication conditions are good is selected and the male connector 110 is connected to the female connector 120. Therefore, it is possible to achieve good communication conditions regardless of the installation position.

The above-described embodiment is a preferred embodiment of the invention. However, the invention is not limited to the above-described embodiment and various modifications and changes of the invention can be made without departing from the scope and spirit of the invention. For example, in the above-described embodiment, the male connector 110 and the female connector 120 each include 20 terminals. However, the number of connection terminals is not limited to 20.

What is claimed is:

1. A connector that connects a wireless communication module to an electronic apparatus, comprising:
a plug and a receptacle that are fitted to each other,
wherein the plug includes a plurality of first contacts which are connected to a power line and a plurality of second contacts which are connected to a grounding line,
the plurality of first contacts are arranged at positions which are symmetric with respect to the center of a junction surface with the receptacle,
the plurality of second contacts are arranged at positions which are symmetric with respect to the center of the junction surface,
when the plug is connected to the receptacle in any of the first and second directions which are symmetric with respect to the center of the junction surface, the plurality of first and second contacts are connected to contacts of the receptacle,
the receptacle includes a plurality of third contacts which are connected to the power line and a plurality of fourth contacts which are connected to the grounding line,
the plurality of third contacts are arranged at positions which are symmetric with respect to the center of a junction surface with the plug, and
the plurality of fourth contacts are arranged at positions which are symmetric with respect to the center of the junction surface.

2. The connector according to claim 1,
wherein, when the receptacle is connected to the plug in any of the first direction and the second direction, the plurality of third contacts are connected to the plurality of first contacts of the plug connected to the power line, and
when the receptacle is connected to the plug in any of the first direction and the second direction, the plurality of fourth contacts are connected to the plurality of second contacts of the plug connected to the grounding line.

3. The connector according to claim 1,
wherein the plug includes a plurality of fifth contacts which are connected to a pair of differential signal lines used for communication of image data, and
the receptacle includes a plurality of sixth contacts which are connected to the pair of differential signal lines when the plug is connected to the receptacle in the first direction and a plurality of seventh contacts which are connected to the pair of differential signal lines when the plug is connected to the receptacle in the second direction.

4. The connector according to claim 1, further comprising:
a plurality of eighth contacts which are connected to a plurality of signal lines for determining whether the connection direction of the plug to the receptacle is the first direction or the second direction.

5. The connector according to claim 1,
wherein the connector connects a wireless communication module which performs wireless communication using radio waves in a frequency band of 2 GHz or more and the electronic apparatus.

6. The connector according to claim 1,
wherein the plug is provided in the wireless communication module, and
the receptacle is provided in the electronic apparatus.

7. The connector according to claim 1,
wherein the plug and the receptacle include 2×n contacts which are arranged in a matrix of two rows and n columns (n is an even number equal to or greater than 2), and
at least an (n/2)-th contact from one end of a first row, an ((n/2)+1)-th contact from the one end of the first row, an (n/2)-th contact from one end of a second row, and a ((n/2)+1)-th contact from the one end of the second row are assigned to the power line.

8. The connector according to claim 1,
wherein the plug and the receptacle include 2×n contacts which are arranged in a matrix of two rows and n columns (n is an odd number equal to or greater than 3), and
at least an $((n+1)/2)$-th contact from one end of a first row and an $((n+1)/2)$-th contact from one end of a second row are assigned to the power line.

9. The connector according to claim 1,
wherein the plug and the receptacle include 2×n contacts which are arranged in a matrix of two rows and n columns (n is a natural number equal to or greater than 2), and
at least $(1+3m)$-th (m is an integer equal to or greater than 0) contacts from one end of each of a first row and a second row, which are equal to or less than n, are assigned to the grounding line.

* * * * *